United States Patent [19]

Scanlon et al.

[11] Patent Number: 5,149,251
[45] Date of Patent: Sep. 22, 1992

[54] METAL/COMPOSITE SPINNER CONE

[75] Inventors: John F. Scanlon, Okemos; Gary Wigell, Lansing, both of Mich.

[73] Assignee: Auto Air Composites, Inc., Lansing, Mich.

[21] Appl. No.: 830,593

[22] Filed: Feb. 4, 1992

Related U.S. Application Data

[62] Division of Ser. No. 614,289, Nov. 15, 1990.

[51] Int. Cl.$^5$ .............................................. B64C 11/14
[52] U.S. Cl. ................... 416/245 R; 416/224
[58] Field of Search .......... 416/244 A, 245 R, 245 A, 416/224; 415/182.1, 218.1, 219.1, 220

[56] References Cited

U.S. PATENT DOCUMENTS

| | | | |
|---|---|---|---|
| 2,401,247 | 5/1946 | Hunter | 416/245 R |
| 3,637,325 | 1/1972 | Morley | 416/224 |
| 3,699,623 | 10/1972 | Kreider | 416/224 |
| 3,762,835 | 10/1973 | Carlson et al. | 416/224 |
| 3,990,814 | 11/1976 | Leone | 416/245 R |
| 4,140,433 | 2/1979 | Eckel | 415/218.1 |
| 4,624,820 | 11/1986 | Barraclough | 264/512 |
| 4,863,354 | 9/1989 | Asselin et al. | 416/245 R |
| 4,957,415 | 9/1990 | Paul et al. | 416/245 R |

*Primary Examiner*—Edward K. Look
*Assistant Examiner*—James A. Larson
*Attorney, Agent, or Firm*—Robert E. Knechtel; Basil E. Demeur; Alan B. Samlan

[57] ABSTRACT

A hybrid metal/composite spinner cone used in aircraft applications. The spinner cone has a metal outer shell which is bonded during the molding process to an inner structural member of thermoplastic composite. The metal shell imparts several desirable characteristics to the spinner cone such as impact resistance, erosion resistance, appearance, and supplying a lightning strike material to protect the composite structure. The thermoplastic composite has significant property advantages over metal or thermoset systems. The hybrid metal/composite spinner cone is manufactured using a ceramic mold which is less expensive and more readily available than a steel mold. The metal shell provides a barrier between the thermoplastic composite and the ceramic mold and allows the finished spinner cone to be easily released from the mold.

4 Claims, 1 Drawing Sheet

METAL/COMPOSITE SPINNER CONE

This is a divisional of co-pending application Ser. No. 614,289 filed on Nov. 15, 1990.

BACKGROUND AND SUMMARY OF THE INVENTION

This invention relates to spinner cones used in aircraft applications and is more particularly related to the method of manufacturing a spinner cone having a metal outer shell with an underlying thermoplastic advanced composite.

Spinner cones are located at the front of aircraft engines. The design criteria for a spinner cone are weight, dynamic strength, and impact resistance. Impact resistance is critical due to birds or other foreign objects striking the spinner cones. Obviously due to the aircraft application, weight is of great concern and the lighter the spinner cones, the more desirable its design.

Most spinner cones produced today are manufactured from two materials. The first materials are metallic materials traditionally used in aircraft applications. The cones are formed in traditional metal forming ways such as spinning if working with relatively thin metal plates or forging and machining. This latter process is preferable when thicker gauge spinner cones are required, but this process is also more expensive and time consuming.

A second group of materials are thermoset composites which offer weight and cost savings as compared to metal spinner cones. Generally speaking, thermoset matrix composite spinner cones do not offer high impact resistance without significantly increasing their thickness, which in turn increases their weight. Some thermoset composites will give the desired weight and impact resistance, but at the expense of other desirable characteristics. For example, glass/epoxy or Kevlar aramid can be used to produce a desired weight and impact resistance of a finished spinner cone. Generally speaking, Kevlar/epoxy has a high impact strength, but is much less capable, especially in compression loads than glass/epoxy. Carbon/epoxy is very infrequently used in spinner cone applications because one of the primary criteria for a spinner cone is impact resistance. Carbon/epoxy is typically very strong, but also very brittle and is not capable of withstanding impact loads like glass/epoxy or Kevlar/epoxy.

To fabricate a spinner cone from glass/epoxy or Kevlar/epoxy, a semi-cylindrical or gore section which has been cut from the preimpregnated sheet stock material is placed in a female mold portion which has been prepared by applying a mold release to the inner surface of the mold. The mold is most frequently made of aluminum. The semi-cylindrical or gore sections are placed in the mold and the seams are staggered with successive plies placed in the mold until the desired laminate thickness is achieved. Once the hand lay-up is completed, the mold and part are placed in a vacuum bag and a vacuum is applied to it. The mold and part are then placed into an autoclave where pre-determined pressure and temperature are applied for a suitable time necessary to polymerize the resin system and consolidate the part into a structural component. The temperature normally used for these thermoset materials is either 250° F. or 350° F., depending upon the epoxy system. An aluminum tool is suitable for use in this temperature range.

Thermoplastic advanced composites have significant property advantages over thermoset systems such as an impact resistance of up to 10 times higher, improved microcrack resistance, negligible moisture absorption, superior flame and radiation resistance, and excellent damping characteristics. They require no refrigeration and do not change properties after extended storage. Parts made from thermoplastic composites may be reheated and reformed, scrap can be recycled, and no toxic emissions are produced during processing.

However, structural thermoplastic materials require approximately 700° F. for a processing consolidation temperature. This temperature requirement limits the number of mold materials suitable for use in production. Aluminum is no longer a viable option. Instead, materials such as electroless nickel-plated molds or steel molds must be used. The fabrication of high temperature molds is usually expensive and require a long lead-time for development.

Cast ceramic molds processing temperatures, and can be fabricated in short lead times. A disadvantage of cast ceramic molds are that they are likely to delaminate or degrade at the surface. This is caused during the molding of parts and results from the resins ingressing into micropores or microcracks in the surface of the ceramic mold. When the part is stripped from the mold, portions of the ceramic mold are stripped with the part causing degradation of the mold's surface. After a relatively few number of parts are manufactured using this process, the surface of the ceramic mold is effectively destroyed.

Applicant's inventive method provides a means of allowing inexpensive and quickly produced cast ceramic molds to be used in processing advanced thermoplastics matrix composites.

In Applicant's inventive process, a thin metal layer or shell is applied to the surface of the ceramic mold. The thickness of the metal shell and the metal selected is dependent upon the characteristics desired of the final finished spinner cone. The thermoplastic composite is then applied over the metal shell to its required thickness. The mold is then closed and heated. The pressure and temperature cause the polymers in the resin system to consolidate into the part, bond with the metal layer and form the final structural component. The hybrid metal/thermoplastic matrix composite part has numerous advantages over the present state-of-the-art thermoset or metal spinner cones.

OBJECTS AND ADVANTAGES

Accordingly, it is an object of the present invention to produce a spinner cone having a metal outer surface with an underlying thermoplastic matrix structure. Related to this object is the object of providing a spinner cone having enhanced impact resistance as compared to either a thermoset or a thermoplastic matrix structure.

Another object is to provide a spinner cone having a metal/composite structure which has increased erosion resistance while maintaining the lighter weight advantage of a composite structure.

Another object is the object of providing a spinner cone having a high degree of solvent resistance as compared to a metal spinner cone.

Still another object is the object of providing a spinner cone having the ability to offer a wide choice of material and surface finishes not available with only a composite structure.

An advantage of having a metal/composite spinner cone is that the need for a separate lightning strike material to protect the composite structure is eliminated. A separate lightning strike material is normally required with a composite structure to protect the structure in the event of a lightning strike.

Yet another object is the object of molding a spinner cone in a ceramic tool without destroying the surface of the ceramic tool after a relatively small number of parts are manufactured.

These and other objects and advantages will become apparent upon reading the brief description of the drawings and detailed description of the preferred embodiment.

DETAILED DESCRIPTION OF THE PREFERRED EMBODIMENT

Figure 1:
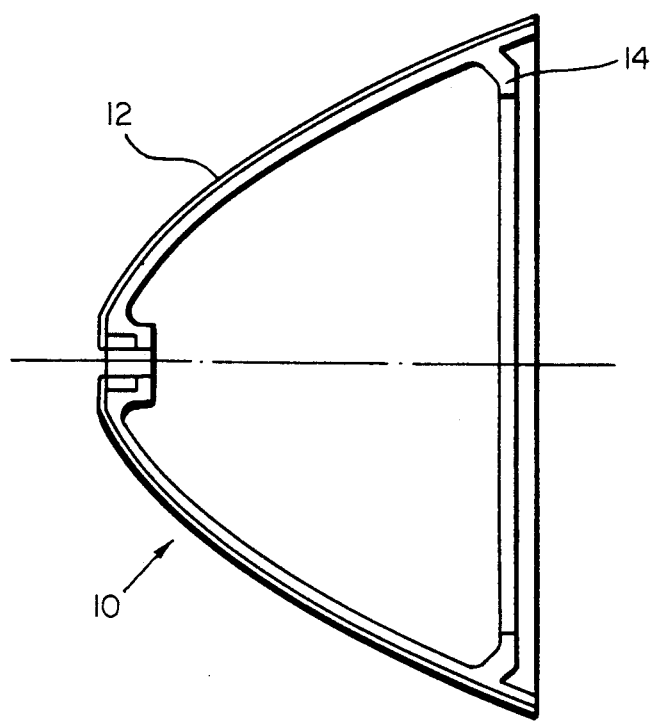
FIG. 1 is a cross-sectional view of a spinner cone manufactured from the inventive process.

Turning first to FIG. 1, there is illustrated a spinner cone 10 manufactured according to the present inventive process. The cone 10 is generally parabolic in shape. There is a thin outer metal shell 12 which defines the lateral sides of the cone and can vary from film thickness to structural gauge. If a thin outer metal shell 12 is desired which is not to be structurally supporting, it will still impart the beneficial characteristics of erosion resistance, solvent resistance, lightning strike material, and cosmetic and surface finish to the spinner cone 10.

Beneath the thin metal shell 12 is a thermoplastic advanced composite structural member 14. Depending upon the ultimate characteristics desired in the spinner cone, one can select from a wide range of thermoplastic composites. One thermoplastic which has been successfully used is polyetheretherketone ("PEEK") prepregs manufactured by ICI/Fiberite, Wilmington, Del. A glass/PEEK structural member has been found to impart the desirable characteristics required in a spinner cone.

Figure 2:
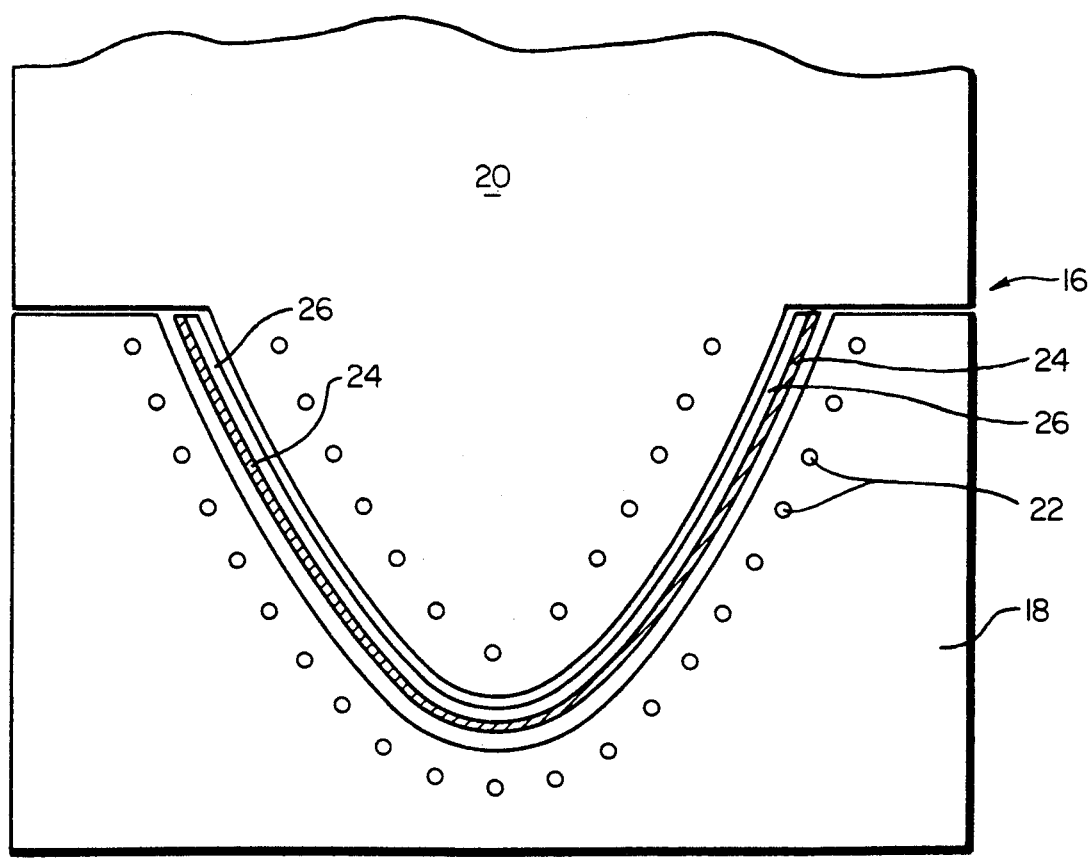
FIG. 2 is a cross-sectional view with portions removed of a ceramic mold used to make the cone further illustrating the position of the thin metal wall and thermoplastic composite structure of the spinner cone.

Next, turning to FIG. 2, a ceramic mold 16 which is utilized to make the spinner cone 10 is illustrated. A ceramic mold can be relatively quickly and inexpensively cast as opposed to steel molds which are expensive and have long lead times for development. Furthermore, a ceramic mold can withstand the higher temperatures required for thermoplastic molding.

The ceramic mold 16 has a bottom female portion 18 and a top male portion 20 which mates with the bottom portion 18 during the molding process. There are a plurality of imbedded heating elements 22 in both the bottom female portion and the top male portion 20 to control the heat within the molding cavity. The heating elements 22 are resistance-type heaters placed within channels in the mold. The channels can also be used to cool the mold after the process is complete by circulating a cooling fluid such as water through the channels.

The steps to manufacture the spinner cone 10 are described below. The ceramic mold 16 is opened by pivoting or lifting the top male portion 20 away from the bottom female portion 18. A thin metal wall 24 is then applied to the interior surface of the bottom female mold 18. It is beneficial, although not mandatory, to apply a release substance to the mold surface before applying the metal wall to assist in releasing the finished product after the molding process is completed. The metal wall 24 can be applied in any one of several methods. If a very thin metal wall is desired, a metal foil can merely be pressed against the mold surface. Alternatively, the mold surface may be flame sprayed with metal to the desired thickness. Flame spraying is commonly used to apply a thin layer of metal to a surface by means of ionizing the metal with a torch, charging it, and spraying it on to the receiving surface. Alternatively, if a thicker metal wall is desired, the metal may be pre-formed from a sheet by spinning, press forming, explosive forming, or other suitable techniques. The pre-formed metal wall is then inserted into the bottom female mold 18. A eutectic metal may be cast into the mold or cast in a separate mold and placed within the bottom female portion 18. If a eutectic metal is selected, the eutectic may be a thin film or a thicker gauge material depending upon the application. The eutectic is chosen so that the melt temperature is compatible with the entire process temperature and pressure utilized in the consolidation of the final hybrid metal/composite spinner cone. The intent is for the eutectic to soften and intermingle with the thermoplastic composite matrix and fiber at the interface between the two materials.

The particular method of putting the metal wall 24 within the bottom female portion 18 will have some effect on the final structure. The reason is that the interface between the metal and the composite structure is the bonding interface between the two materials. If the metal has an irregular surface, the composite matrix will have greater mechanical bonding with the metal than if the metal surface is relatively smooth. Depending upon the characteristics required in the spinner cone, a strong mechanical bond may not be necessary in which case a relatively smooth metal inner surface may be acceptable.

Once the metal wall 24 is placed within the bottom female portion 18, the thermoplastic composite 26 must be placed on top of the metal wall 24. When manufacturing a cylindrical spinner cone, the thermoplastic materials are generally cut from semi-cylindrical or gore sections which have a curved contour. Alternatively, sheets of thermoplastic material can be laid onto the metal wall 24. It has been found to be a great advantage to put a thin layer of spray adhesive onto the metal before attempting to lay up the thermoplastic materials. Several plys of thermoplastic material are placed upon the metal wall 24. Again, a thin layer of spray adhesive is useful between plys to keep the subsequent layer of thermoplastic material in place Otherwise, the thermoplastic sheets would behave like cloth layers and would tend to slide out of position with respect to each other. The number of plys will vary depending on the final thickness and characteristics desired. The thermoplastic deposit described above has been applied by means of thermoplastic sheets. However, the thermoplastic can be in any of a number of forms such as sheet material, tape, or power. The important point is that the thermoplastic composite is positioned against the thin metal wall so that the desired thickness will be formed during the molding process across the entire interior surface of the metal wall. Alternatively, there may be portions along the metal wall 24 which require a thicker thermoplastic composite for structural strength This can be achieved by modifying the top male portion of the mold and building up a thicker layer at the selected portions during the laying up procedure.

Once the proper thickness is built up, the mold is closed by the male portion 20 being pivoted over or lowered upon the bottom female portion 18. The mold is heated to the proper temperature which is generally in the range of 575° F.–800° F. Additionally, the mold will apply a pressure in the range of 150–300 psi during the molding process. In actual tests, a pressure of 200 psi and a temperature of 750° F. when using a glass/polyetheretherketone thermoplastic produced a satisfactory finished spinner cone. The top portion 20 may not be able to complete its seating on the bottom portion 18 until the thermoplastic composite has begun to melt. Once melting begins, the top portion 20 will completely seat and compress upon the bottom portion 18 to the preset distance and pressure. Depending upon the thermoplastic composite selected, its thickness and the composition and thickness of the metal wall 24, the time, temperature, and pressure of the molding process is determined. The intent is to have the surface between the metal wall 24 and the thermoplastic composite structure 26 mechanically bond. Furthermore, the thermoplastic composite must polymerize the resin system and consolidate the part into the desired finished spinner cone 10. Thermoplastics can be chosen from the group consisting of carbon reinforced nylon, glass reinforced nylon, aramid reinforced nylon, polybutylene terephthalate, polypropylene, polyarylether sulfone, polyether imide, polysulfone, polyphenylene sulfide, polyarylene sulfide, and polyetheretherketone.

When the molding process is completed, the mold is cooled. This can be done by merely turning off the heating elements 22 and allowing the mold to cool to an ambient temperature or by flowing a coolant through the channels in which the heating elements 22 are positioned in which case the mold will cool down much more rapidly. Once the mold is cooled, the top portion 20 is separated from the bottom female portion 18. The spinner cone 10 is removed form the mold and can be finished by removing any flashing or performing any necessary trimming.

The thin metal wall 24 acts as a release mechanism to release the finished spinner cone 10 from the mold 16. The metal wall 24 does not become embedded into the microcracks within the ceramic mold 16. Furthermore, the metal wall 24 acts as a barrier between the thermoplastic composite and the bottom portion 18 of the ceramic mold 16. After the molding process, the metal wall 24 then becomes an integral part of the finished spinner cone 10. Thus we can see that the metal wall 24 actually performs two functions. First, it acts as a means to release the thermoplastic composite from the mold, and second, it imparts desirable characteristics to the finished product. By using a metal wall 24 we can utilize the less expensive, more rapidly designed and cast ceramic molds which were heretofore not used for molding thermoplastic advanced deposits. By utilizing this process, spinner cones can be molded which are lighter, stronger, and have other desirable characteristics which were heretofore not available in metal or thermoset spinner cones.

Accordingly, there is provided a spinner cone and method of manufacturing the same that fully satisfies the aims, objects, and advantages set forth above. It is evident that many alternatives, modifications, and variations will be apparent to those skilled in the art. Accordingly, it is intended to embrace such variations as fall within the spirit and broad scope of the appended claims.

What is claimed is:

1. A parabolic spinner cone for airplane engines comprising:

a metal shell defining the lateral sides of the parabolic cone, the shell having an interior and exterior surface, and a thermoplastic composite structural member bonded to the interior surface of the metal shell.

2. The parabolic spinner cone of claim 1 wherein the thermoplastic composite structural member is mechanically bonded to the interior surface.

3. The parabolic spinner cone of claim 2 wherein the thermoplastic composite structural member is chosen from the group consisting of carbon reinforced nylon, glass reinforced nylon, aramid reinforced nylon, polybutylene terephthalate, polypropylene, polyarylether sulfone, polyether imide, polysulfone, polyphenylene sulfide, polyarylene sulfide, and polyetheretherketone.

4. The parabolic spinner cone of claim 2 wherein the thermoplastic composite structural member is also parabolic and of the same contour as the interior surface of the metal shell.

* * * * *